Dec. 8, 1959    A. C. SCINTA    2,915,770
WINDSHIELD CLEANER
Filed Dec. 6, 1955
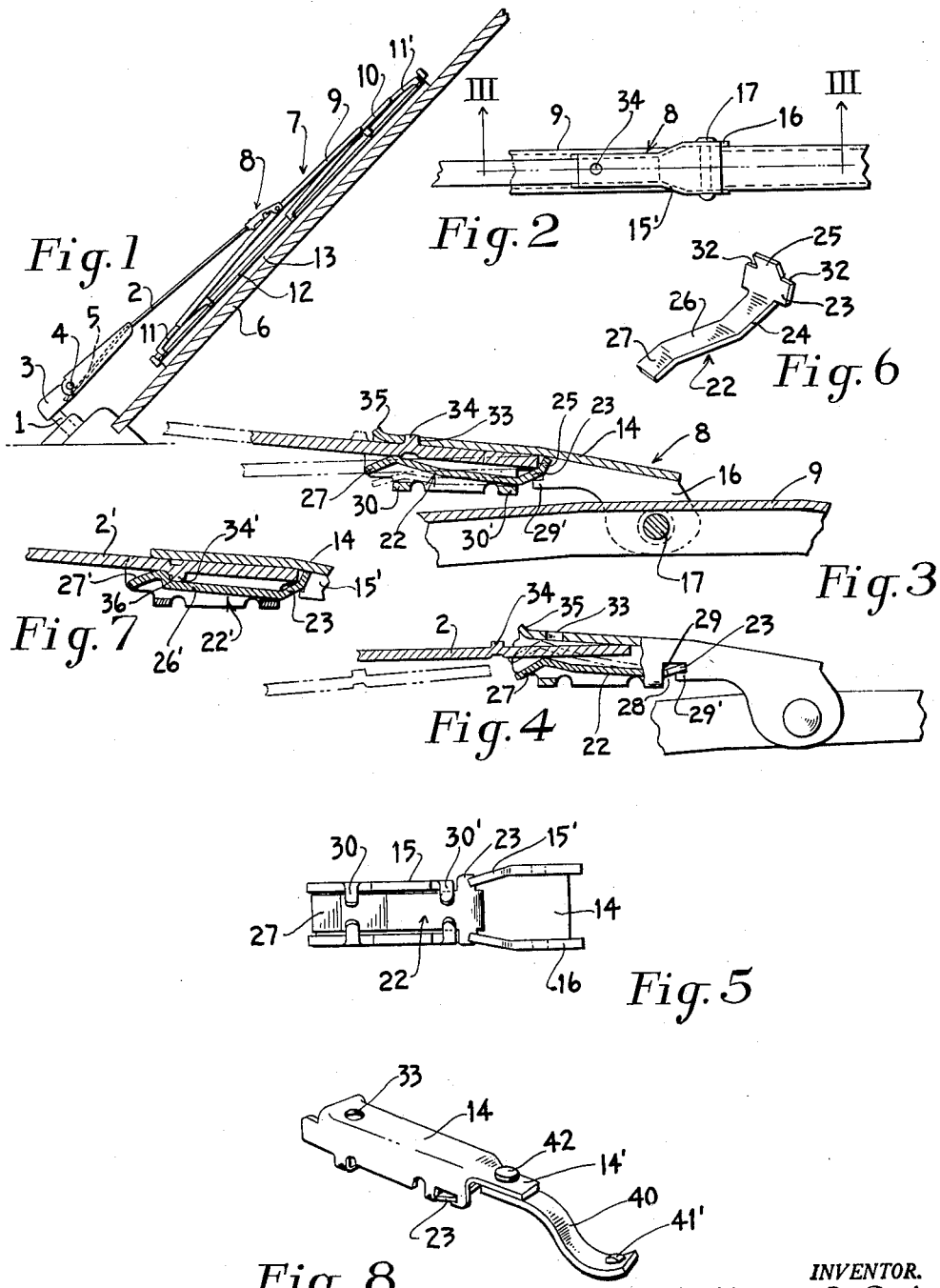
INVENTOR.
Anthony C. Scinta
BY
Bean Brooks Buckley & Bean
ATTORNEYS

United States Patent Office 2,915,770
Patented Dec. 8, 1959

2,915,770

WINDSHIELD CLEANER

Anthony C. Scinta, Hamburg, N.Y., assignor to Trico Products Corporation, Buffalo, N.Y.

Application December 6, 1955, Serial No. 551,271

1 Claim. (Cl. 15—250)

This invention relates generally to the vehicle window cleaner art, and more particularly to a new and useful attaching clip for releasably securing a wiper blade to an actuating arm, this application being directed to certain improvements in attaching clips of the type forming the subject matter of my copending application Serial No. 375,984 and now Patent No. 2,807,822.

In pending application Serial No. 375,984 there is disclosed a novel blade attaching clip which enables the blade to rock about a transverse axis and thereby vary its longitudinal inclination and better conform to window surfaces of different inclination and of varying curvature and/or inclination, which clip permits such rocking of the blade without hindrance by reason of blade twisting forces, which positively locks the blade to the actuating arm in a new and useful manner, and which is relatively simple and inexpensive in construction and extremely durable and reliable in operation.

The present invention is directed to certain improvements in blade attaching clips of the type set forth in said pending application, and it is a primary object of this invention to provide a wiper attaching clip of that general type which is of improved construction embodying novel entrance means facilitating insertion of the arm end therein, novel spring retaining means, and positive stop means facilitating positioning of the arm end therein.

An attaching clip in accord with the instant invention has an elongated member adapted adjacent one end for attachment to a wiper blade and having adjacent its other end a casing adapted to receive a shouldered arm end in longitudinally telescoping relation therewith, the casing including means defining a shouldered part and spring means for resiliently urging the shouldered arm end and the shouldered part into interlocking relation.

In one aspect thereof, an attaching clip in accord with this invention is characterized by the provision of an elongated spring member carried by the casing and terminating adjacent its inner end in a positive stop portion facilitating positioning of the arm end in the casing.

In another aspect thereof, an attaching clip in accord with this invention is characterized by the provision of an elongated spring member carried by the casing and having, adjacent its inner end, a laterally enlarged locking flange portion, the casing side walls each having means including a shelf-forming recess receiving and retaining the locking flange portion.

An attaching clip in accord with the instant invention is characterized in still another aspect thereof by the provision of a flared entrance to the casing facilitating passage of the shouldered arm end between the shouldered wall part and the spring means and into the casing.

The foregoing and other objects, advantages and characterizing features of an attaching clip in accord with this invention will become clearly apparent from the ensuing detailed description, taken together with the accompanying drawing forming a part thereof wherein:

Fig. 1 is a side elevational view of a wiper assembly incorporating a presently preferred embodiment of my new attaching clip in operative association with a vehicle windshield;

Fig. 2 is a fragmentary plan view thereof showing the attaching clip;

Fig. 3 is a longitudinal sectional view thereof taken about on line III—III of Fig. 2 and showing certain steps in assembling the clip on the actuating arm;

Fig. 4 is a view corresponding to Fig. 3 but showing other steps in assembling the clip on the arm;

Fig. 5 is a bottom plan view of the attaching clip;

Fig. 6 is a perspective view of the clip carried, arm retaining spring;

Fig. 7 is a longitudinal sectional view showing a modified form of attaching clip; and Fig. 8 is a perspective view of the attaching clip modified to accommodate an adaptor for attachment in a different manner to a wiper blade.

Referring now to the accompanying drawing, and more particularly to Figs. 1 through 6 thereof, a presently preferred embodiment of attaching clip in accord with the instant invention is illustrated in a windshield cleaner combination including a conventional rockshaft 1 which is driven by a motor of known type, not illustrated, rockshaft 1 being journaled in the vehicle cowl adjacent the bottom edge of the windshield 6. A two-part actuating arm having an outer end 2 and an inner end 3 is mounted on the outer end of rockshaft 1 for being oscillated thereby, the ends 2 and 3 being pivotally connected as at 4, and a biasing spring arrangement 5 of known form is provided for urging the outer arm end 2 toward the surface of window 6 in known manner.

A wiper blade, generally designated 7, is releasably secured to the outer terminal of the arm part 2 by an attaching clip of the instant invention, generally designated 8. Blade 7, which can be any of various known types adapted for use either with curved or with flat windshields, or with both, has in the example illustrated herein a pressure distributing superstructure including a rigid primary member 9 pivotally supporting at its inner end a secondary member 11 and at its outer end a lever 10. The opposite ends of member 11, and the inner end of lever 10, are connected to a blade body unit including a resilient backing 12 which is laterally substantially rigid but flexible in a plane normal to the surface of window 6 and an elongated flexible blade body 13 supported and urged into surface conformance thereby. The outer end of lever 10 pivotally supports a member 11' which is connected adjacent its opposite ends to the blade unit. It is to be understood that the clip of the instant invention is not limited to use with such a blade but can be used with any of various different types of blades either presently adapted or readily modified to receive the same.

Attaching clip 8 comprises an elongated member of inverted generally channel shape having a top wall part 14 comprising the channel web and transversely spaced side wall parts 15 depending therefrom. Adjacent one end thereof side wall parts 15 flare outwardly, as at 15', and are formed to provide spaced apart ears 16 which straddle the member 9 and which are suitably apertured to receive a transverse pivot pin 17 such as, for example, a rivet.

Thus, attaching clip 8 is pivotally connected to the pressure distributing superstructure of blade 7 by the pin 17, enabling rocking of the blade 7 about an axis transverse thereto as defined by pin 17 to vary the longitudinal inclination of the blade with respect to the attaching clip and to the actuating arm.

A particular feature of an attaching clip according to the instant invention resides in the means provided thereby for interlocking with an actuating arm to permit the aforesaid longitudinal rocking of the blade while insuring that the blade, while readily releasable from the arm, is firmly secured thereto. To this end, the outer end portion of the clip 8, being the end portion thereof remote from pin 17 comprises a case adapted to receive the terminal end 2 of the wiper arm and carrying a spring member 22 which releasably holds the arm end 2 and the clip 8 in interlocked relation.

Spring member 22 preferably comprises a leaf type spring formed adjacent its inner end to provide a laterally enlarged locking flange portion 23 inclined upwardly from an adjacent fulcrum portion 24, together with a terminal stop portion 25 extending upwardly from the locking flange portion 23. Adjacent its opposite end fulcrum portion 24 adjoins a body part 26 inclined upwardly therefrom and terminating adjacent its outer end in a downwardly inclined portion 27.

The casing side wall parts 15 are formed to provide inverted substantially L-shaped recesses comprising a transverse entrance leg or passage 28 and an inwardly longitudinally extending, shelf forming leg or branch 29, the spring locking flange portion 23 being slip-fitted therein and resting substantially within the shelf forming leg 29 of the recess, as illustrated for example in Figs. 3 and 4. Side wall parts 15 also are formed with inturned projections or prongs 30 and 30' at longitudinally spaced points therealong, and the prongs 30' are turned inwardly toward each other and confine the spring locking flange portion 23 within the recess. It will be appreciated that the locking flange portion 23, engaging as it does not only within a recess but within the inverted L shape recess, is precluded against accidental disassembly from the clip 8 by the prongs 30' and the shelf part 29'.

It will be noted that when the spring and clip are assembled in this manner the spring fulcrum portion 24 bears against the inturned projections 30' and the upper shoulders 32 formed by the locking flange portion 23 bear against the upper edge of the recess branches 29, whereby the juncture between the spring portions 26 and 27 is urged against top wall part 14 adjacent the forward edge thereof, as illustrated in broken lines in Fig. 4.

Top wall 14 is formed adjacent the forward or entrance edge of the casing end portion with a shoulder defining aperture 33, and the arm 2 is struck to provide a shoulder defining, upstanding lug 34 which, upon assembly of the arm and the clip, engages in the aperture 33.

When assembling the clip on the arm, the arm end is inserted between the clip casing top wall part 14 and the spring 22, forcing the spring 22 away from the top wall part 14 first to its partially extended position shown in full lines in Fig. 4 and then to its fully extended position shown in double broken lines in Fig. 3, and it will be noted that the inturned prongs 30 provide a lower stop to extension movement of the spring 22 in the casing. When the arm end 2 is completely inserted into the clip casing spring 22 urges the lug 34 into the aperture 33 for releasably interlocking the arm and the clip. Upon detaching the blade from the arm, the reverse procedure is followed.

It will be noted that when the arm end is fully inserted in the attaching clip, the two parts are securely, although releasably, interlocked in a way providing a positive and tight engagement which avoids sloppiness and looseness in the system.

Another particular feature of this invention is that means are provided greatly facilitating insertion of the arm end into the attaching clip case portion. It will be appreciated that with a strong spring 22 it is difficult to force the same from the top wall part 14 even with the downwardly inclined spring portion 27 serving as a camming surface, and this is particularly true when passing the lug 34 beneath the top wall part 14 prior to its entry into the aperture 33. Accordingly, the clip is provided, in accord with this invention, with a flared entrance by forming the top wall part 14 with an upwardly curving front edge portion 35. Thus, upon inserting the arm end 2 into the clip case the flared entrance provided by spring part 27 and casing part 35 guides the arm end to smoothly urge the spring 22 to its partially extended position, and lug 34 then bears against the curving flare 35, immediately following the position shown in single broken lines in Fig. 3, urging the spring to its fully extended position as the arm end is further inserted into the case.

Another feature of a clip in accord with this invention resides in the provision of stop means facilitating the proper positioning of the arm in the clip case. To this end, the terminal portion 25 of spring 22 is formed to extend upwardly, toward top wall part 14, at the point reached by the extreme outer end of the arm part 2 when the clip is fully assembled thereon, as shown in full lines in Fig. 4. Therefore, when inserting the arm end into the clip the arm end will abut the spring terminal portion 25, and be stopped thereby, at a position where lug 34 will engage in aperture 33. It will be appreciated that this renders the assembly of the clip on the arm faster and easier.

In addition, flange portion 23 serves to guide and cam the arm end into flat supporting contact with the top wall 14 of the arm-receiving housing and, with the juncture between spring parts 26 and 27, holds lug 34 and aperture 33 interlocked.

Fig. 7 illustrates a modified form of attaching clip according to this invention wherein the parts are for the most part the same as in Figs. 1 through 6. However, instead of the aperture 33 in the top wall part 14, the arm end 2' has a lug 34' which is struck downwardly and which engages against a shoulder formed on the spring 22'. Thus spring 22', which has a locking flange 23 identical with that shown in Fig. 6, is provided with a main body part 26' which joins a curved entrance portion 27' at substantially a right angle thereto, providing the abrupt shoulder 36 to receive the lug 34'. It is contemplated that lug 34' will ride over the spring portion 27' when assembling the clip on the arm end, and that the spring portion 27' will be depressed, by an appropriate tool, to permit withdrawal of the arm end from the clip. Obviously, top wall part 14 of the clip of Fig. 7 can have the curved entrance portion 35.

Also while in the presently preferred form the attaching clip 8 terminates in the straddling ears 16 for pivotal connection to the blade, it is contemplated that in some instances it might be desired to provide this novel attaching clip, with its attendant advantages, for use with other types of connection to the blade, such as those having a housing formed with a concave shouldered top wall portion adapted to receive a similarly concave spoon portion 40, Fig. 8, having a lug 41 to engage with the blade housing shouldered wall portion in a manner known in the art. For this purpose, the ears 16 will be deleted and a spoon member 40 can be secured to an extension 14' of the top wall 14, as by a rivet 42.

Accordingly, it is seen that my invention fully accomplishes the aforesaid objects and provides a novel attaching clip which overcomes the difficulties previously mentioned. While but one main embodiment and two variations thereof have been illustrated herein, my invention is not necessarily limited to the specific details thereof and I realize that modifications might well occur to those skilled in the art without in any way departing from the spirit and scope of the invention. Accordingly, I intend that my invention be determined and defined by the appended claim.

Having fully disclosed and completely described my invention, together with its mode of operation, what I claim as new is:

A wiper assembly comprising a wiper blade, an actuating arm having an end portion including a flat end face and an inwardly spaced shoulder, an elongate integral clip member, means pivotally connecting said clip member adjacent one end thereof to said wiper blade along a transverse axis, the opposite end portion of the clip member being in the form of an elongate housing opening through the other end of said clip and adapted to slidably receive therein said actuating arm end portion, said housing having means providing a shoulder adapted for engagement with the shoulder of said end portion, an elongate flat spring having an inner portion joined by a pivot edge to a relatively longer main body portion that extends toward the open end of said housing and underlies the housing shoulder to press the shoulder of said end portion of the actuating arm upwardly into interlocking engagement therewith, said spring means including a terminal stop portion which projects upwardly into said housing to the adjacent inner face of said housing for direct abutting engagement with the end face of the arm to prevent the inward movement of the arm in the channel for positioning the shoulders for interengagement, and means securing said spring means in position in said housing and normally retaining it in its upper position and against the inner face of said housing.

References Cited in the file of this patent

UNITED STATES PATENTS

| | | |
|---|---|---|
| 2,234,709 | Rodrick | Mar. 11, 1941 |
| 2,260,905 | Horton | Oct. 28, 1941 |
| 2,602,178 | Bayes et al. | July 8, 1952 |
| 2,751,620 | Ehrlich | June 26, 1956 |
| 2,807,822 | Scinta | Oct. 1, 1957 |

FOREIGN PATENTS

| | | |
|---|---|---|
| 1,023,025 | France | Dec. 24, 1952 |